United States Patent
Ono et al.

(10) Patent No.: US 10,940,615 B2
(45) Date of Patent: Mar. 9, 2021

(54) MOLD CLAMPING DEVICE

(71) Applicant: KYORAKU CO., LTD., Kyoto (JP)

(72) Inventors: Yoshinori Ono, Kanagawa (JP); Kengo Shimada, Kanagawa (JP); Yosuke Muroya, Kanagawa (JP); Shuji Ito, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 220 days.

(21) Appl. No.: 16/068,687

(22) PCT Filed: Mar. 31, 2017

(86) PCT No.: PCT/JP2017/013662
§ 371 (c)(1),
(2) Date: Jul. 9, 2018

(87) PCT Pub. No.: WO2017/171029
PCT Pub. Date: Oct. 5, 2017

(65) Prior Publication Data
US 2019/0016018 A1    Jan. 17, 2019

(30) Foreign Application Priority Data

Mar. 31, 2016  (JP) .............................. JP2016-071254

(51) Int. Cl.
*B29C 45/17*   (2006.01)
*B29C 45/66*   (2006.01)
(Continued)

(52) U.S. Cl.
CPC .......... *B29C 33/24* (2013.01); *B29C 45/1751* (2013.01); *B29C 45/661* (2013.01);
(Continued)

(58) Field of Classification Search
CPC ............ B29C 45/1744; B29C 45/1751; B29C 45/661; B29C 45/681; B29C 33/22; B29C 33/24
See application file for complete search history.

(56) References Cited

U.S. PATENT DOCUMENTS 2,306,323 A * 12/1942 Schoepflin et al. .........................
                                                        B29C 45/1751
                                                        164/314
2,526,803 A    10/1950 Carlson et al.
(Continued)

FOREIGN PATENT DOCUMENTS

CH          576830     *  6/1976
DE     10 2006 017 026 A1   10/2006
(Continued)

OTHER PUBLICATIONS

International Search Report dated Jun. 6, 2017 of corresponding International Application No. PCT/JP2017/013662; 2 pgs.
(Continued)

*Primary Examiner* — James P Mackey
(74) *Attorney, Agent, or Firm* — Maier & Maier, PLLC

(57) ABSTRACT

Provided is a mold clamping device that can simplify the component count or structure by including a mold thickness adjustment mechanism that reduces the load on a power source, is easily maintained, and has high design flexibility. Also provided is a mold clamping device that can set a long distance (daylight) between molds without having to upsize the entire mold clamping device and can simplify the component count or structure.

A mold clamping device for split molds includes a first platen, a second platen, a pressure receiving platen, and a mold thickness adjustment mechanism disposed on the pressure receiving platen. At least one of the first platen and the second platen is able to move back and forth so as to
(Continued)

approach or depart from the other. The pressure receiving platen is located on a side remote from the first platen, of the second platen. The mold thickness adjustment mechanism includes a rod-shaped rotation member, a power source configured to rotate the rotation member around a rotation axis of the rotation member, the rotation axis being parallel to a longitudinal direction of the rotation member, and a pair of converters configured to convert rotation direction of the rotation member into a movement direction of the second platen. A mold clamping device for split molds includes polygonal first and second platens, a pressure receiving platen, and a toggle mechanism. At least one of the first platen and the second platen is able to move back and forth so as to approach or depart from the other. The pressure receiving platen is located on a side remote from the first platen, of the second platen. The toggle mechanism is disposed between the second platen and the pressure receiving platen and on a diagonal line of the second platen and configured to cause the first and second platens to approach or depart from each other.

13 Claims, 9 Drawing Sheets

(51) Int. Cl.
*B29C 33/24* (2006.01)
*B29C 45/68* (2006.01)
*B29C 33/22* (2006.01)

(52) U.S. Cl.
CPC .......... *B29C 33/22* (2013.01); *B29C 45/1744* (2013.01); *B29C 45/681* (2013.01)

(56) References Cited

U.S. PATENT DOCUMENTS

| | | | |
|---|---|---|---|
| 4,598,758 A | * | 7/1986 | Nyland .................. B22D 17/26 164/154.2 |
| 6,050,804 A | | 4/2000 | Tamaki et al. |
| 2010/0155980 A1 | | 6/2010 | Chiang |

FOREIGN PATENT DOCUMENTS

| | | | |
|---|---|---|---|
| EP | 634262 | * | 6/1994 |
| GB | 998665 A | | 7/1965 |
| JP | S61-60253 A | | 3/1986 |
| JP | 5-437 | * | 1/1993 |
| JP | H07-100885 A | | 4/1995 |
| JP | H07-137104 A | | 5/1995 |
| JP | H08-39638 A | | 2/1996 |
| JP | H08-216239 A | | 8/1996 |
| JP | H08-323828 A | | 12/1996 |
| JP | 2014-069417 A | | 4/2014 |

OTHER PUBLICATIONS

Partial Supplementary European Search Report dated Feb. 7, 2019, of corresponding EP Application No. 17775560.0 (17 pgs.).
A. Ansorge: "Can we learn something from die-casting?", vol. 37, No. 6, Jun. 1, 1981, pp. 33-36 (4 pgs.), XP001173768, ISSN: 0091-9578.

* cited by examiner

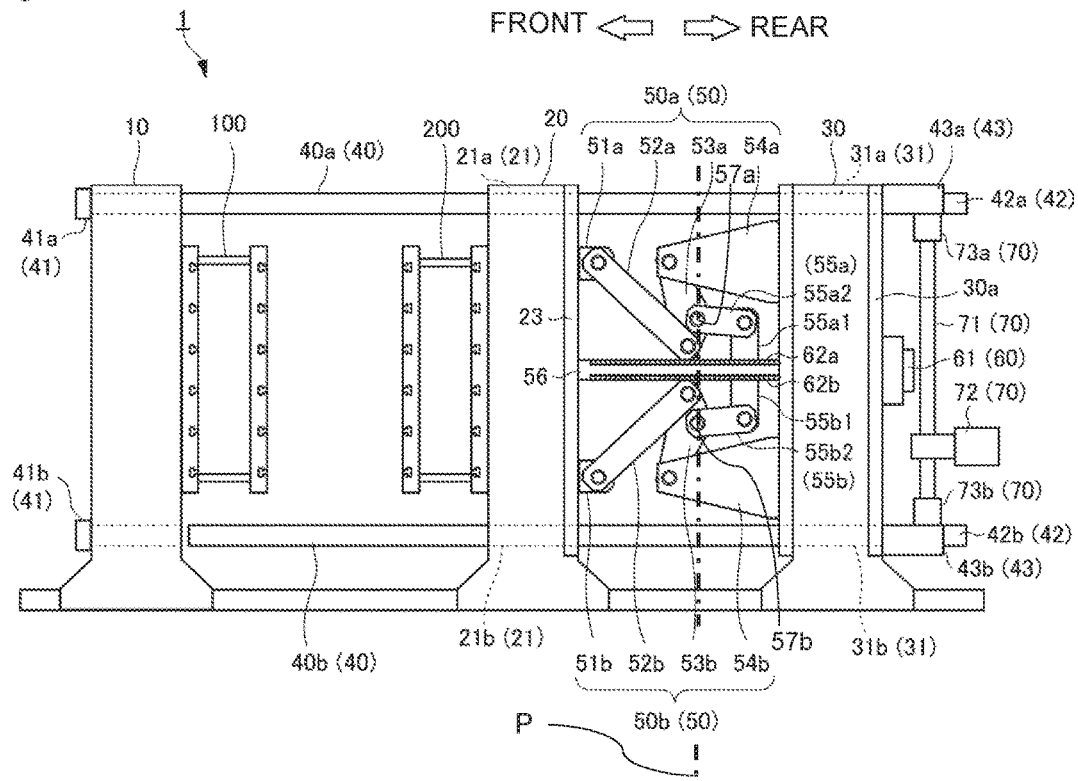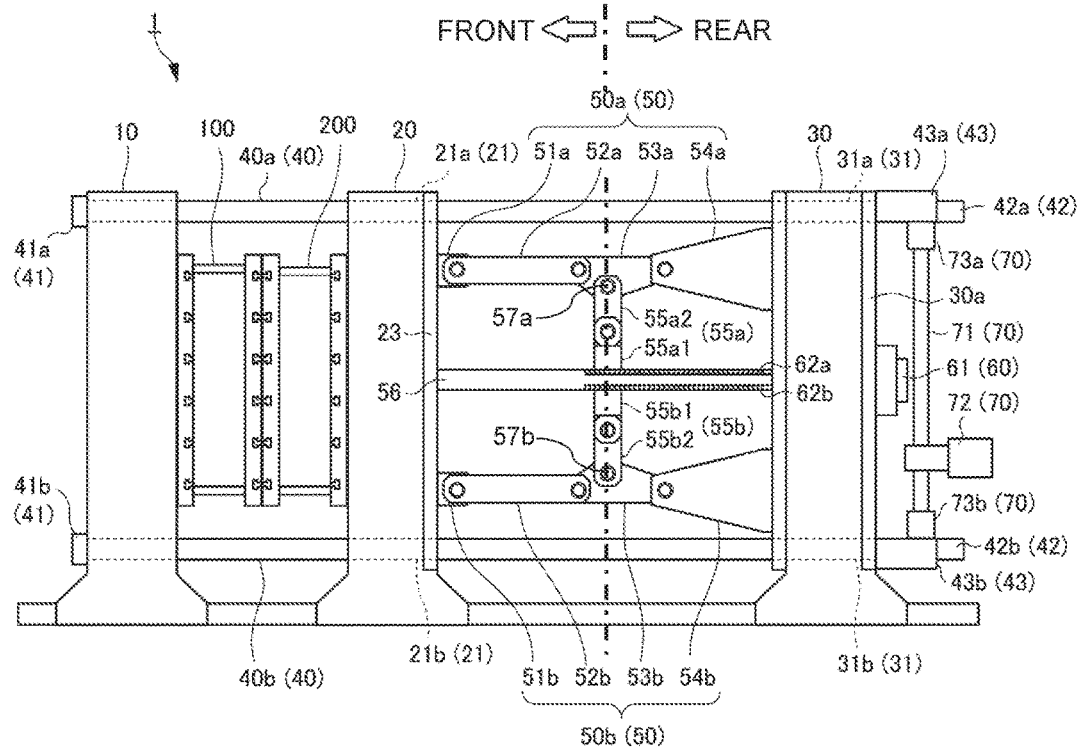

MOLD CLAMPING DEVICE

TECHNICAL FIELD

The present invention relates to a mold clamping device.

BACKGROUND ART

First Aspect

Mold clamping devices using a mold thickness adjustment mechanism have been known as mold clamping devices for use in molding machines (for example, see Patent Literature 1). A mold clamping device generates a mold clamping force by moving tie bars penetrating platens using a mold thickness adjustment mechanism connected to the tie bars to change the distance between molds.

Patent Literature 1 discloses a mold thickness adjustment mechanism that generates a mold clamping force by moving movable and stationary platens having molds mounted thereon, four tie bars penetrating the movable and stationary platens, and gears disposed on the stationary platen in conjunction with each other to change the distance between the platens.

Unfortunately, in Patent Literature 1, a heavy load is imposed on a mold clamping electric motor for moving the huge intermediate gear and driven gear disposed on the stationary platen. For this reason, Patent Literature 1 has a problem that a large electric motor having high output has to be used and the components such as the gears are also large in size and therefore are difficult to maintain. Patent Literature 1 also has a problem that the distance between the tie bars or the size of the stationary platen depends on the sizes of the center gear and driven gear. Further, the four tie bars supporting the movable and stationary platens are set so as to surround a vertically disposed mold transportation mechanism. For this reason, Patent Literature 1 also has a problem that it is difficult to reduce the number of components or simplify the structure.

Second Aspect Mold clamping devices using a toggle mechanism whose driving source is a motor have been known as mold clamping devices for use in injection molding machines (for example, see Patent Literature 2). In a mold clamping device using a toggle mechanism, the point of application moves at low speed at the start and terminal ends of expansion/contraction stroke and moves at high speed in an intermediate position due to a link structure forming the toggle mechanism. Thus, the mold clamping device advantageously can shorten the mold open/close cycle, as well as can cause the molds to touch each other at low speed and thus can protect the molds.

Patent Literature 2 discloses a mold clamping device for use in motor-driven injection molding machines including a mold transportation mechanism that is driven by a first motor and which includes toggle links for moving a movable platen and a mold clamping mechanism that includes narrow-pitch, mold-clamping screws and mold-clamping nuts driven by a second motor and transmission means which transmits the rotation force of the second motor to the mold-clamping nuts, wherein the mold-clamping screws are disposed at ends close to a rear platen, of tie bars, and the mold-clamping nuts are fastened to the mold-clamping screws and rotatably supported by the rear platen at a fixed position.

Unfortunately, in Patent Literature 2, the mold transportation mechanism including the toggle links is disposed vertically with respect to the movable platen and rear platen. For this reason, Patent Literature 2 has a problem that if the lengths of the toggle links are increased to set a long distance (daylight) between the molds in order to replace the molds or take out a molded article, it is necessary to upsize the entire mold clamping device to avoid interference between the pair of opposite toggle links. Also, four tie bars for supporting the movable platen and rear platen are set so as to surround the vertically disposed mold transportation mechanism. For this reason, Patent Literature 2 has a problem that it is difficult to reduce the number of components or simplify the structure.

CITATION LIST

Patent Literature

[Patent Literature 1] Japanese Unexamined Patent Application Publication No. 61-[60253

[Patent Literature 2] Japanese Unexamined Patent Application Publication No. 7-[100885

SUMMARY OF THE INVENTION

Technical Problem

First Aspect

A first aspect of the present invention has been made in view of the foregoing, and an object thereof is to provide a mold clamping device that can simplify the component count or structure by including a mold thickness adjustment mechanism that reduces the load on a power source, can use a power source having lower output, is easily maintained, and has high design flexibility.

Second Aspect

A second aspect of the present invention has been made in view of the foregoing, and an object thereof is to provide a mold clamping device that can set a long distance (daylight) between molds without having to upsize the entire mold clamping device and can simplify the component count or structure.

Solution to Problem

A first aspect of the present invention provides a mold clamping device for split molds. The mold clamping device includes a first platen, a second platen, a pressure receiving platen, and a mold thickness adjustment mechanism disposed on the pressure receiving platen. At least one of the first platen and the second platen is able to move back and forth so as to approach or depart from the other. The pressure receiving platen is located on a side remote from the first platen, of the second platen. The mold thickness adjustment mechanism includes a rod-shaped rotation member, a power source configured to rotate the rotation member around a rotation axis of the rotation member, the rotation axis being parallel to a longitudinal direction of the rotation member, and a pair of converters configured to convert rotation direction of the rotation member into a movement direction of the second platen.

According to the present invention, there can be provided a mold clamping device that can simplify the part count or structure by including a mold thickness adjustment mechanism that reduces the load on a power source, can use a power source having lower output, is easily maintained, and has high design flexibility.

Various embodiments of the present invention are described below. The embodiments below can be combined with each other.

Preferably, a rear surface of the pressure receiving platen is in the shape of a narrow, long plate.

Preferably, the mold clamping device further includes first and second tie bars that penetrate the pressure receiving platen, the second platen, and the first platen and define a relationship between positions of the pressure receiving platen, the second platen, and the first platen, the second platen is in the shape of a polygon, the second platen includes first and second protrusions that protrude onto extensions of a diagonal line of the polygon, and the first tie bar and the second tie bar penetrate the first protrusion and the second protrusion, respectively.

Preferably, the mold clamping device further includes a toggle mechanism disposed between the second platen and the pressure receiving platen and configured to move back and forth the second platen with respect to the first platen, and the toggle mechanism is disposed on the diagonal line of the polygonal second platen.

Preferably, the power source is an electric motor mounted on the rear surface of the pressure receiving platen.

Preferably, the pressure receiving platen includes a frame, and a grounding part of the frame is formed as a reinforcement part extending toward the mold thickness adjustment mechanism.

Preferably, the second platen is able to move back and forth, the pressure receiving platen is located on a side remote from the first platen, of the second platen and is able to move back and forth in a direction opposite to a direction of the second platen in conjunction with the second platen, and the first platen is able to move back and forth in a direction identical to a direction of the pressure receiving platen in conjunction with the pressure receiving platen.

A second aspect of the present invention provides a mold clamping device for split molds. The mold clamping device includes polygonal first and second platens, a pressure receiving platen, and a toggle mechanism. At least one of the first platen and the second platen is able to move back and forth so as to approach or depart from the other. The pressure receiving platen is located on a side remote from the first platen, of the second platen. The toggle mechanism is disposed between the second platen and the pressure receiving platen and on a diagonal line of the second platen and configured to cause the first and second platens to approach or depart from each other.

According to the present invention, there can be provided a mold clamping device that can set a long distance (daylight) between molds without having to upsize the entire mold clamping device and can simplify the component count or structure.

Preferably, the toggle mechanism the toggle mechanism comprises a first toggle including a first front mounting part which is mounted to a first corner of the second platen on the diagonal line and a second toggle including a second front mounting part which is mounted to a second corner of the second platen on the diagonal line, the second toggle being opposed to the first toggle.

Preferably, the first and second mounting parts are mounted to the second platen with a long narrow, long mounting plate disposed between the first and second mounting parts and the second platen.

Preferably, the mold clamping device further includes first and second tie bars that penetrate the pressure receiving platen, the second platen, and the first platen and define a relationship between positions of the pressure receiving platen, the second platen, and the first platen, the second platen includes first and second protrusions that protrude onto extensions of the diagonal line, and the first tie bar and the second tie bar penetrate the first protrusion and the second protrusion, respectively.

Preferably, a rear surface of the pressure receiving platen is in the shape of a narrow, long plate and is disposed on the diagonal line of the second platen so as to correspond to the toggle mechanism.

Preferably, the mold clamping device further includes a mold thickness adjustment mechanism disposed on the rear surface of the pressure receiving platen, the mold thickness adjustment mechanism includes a rod-shaped rotation member, an adjustment motor configured to rotate the rotation member around a rotation axis of the rotation member, the rotation axis being parallel to a longitudinal direction of the rotation member, and a pair of converters configured to convert rotation direction of the rotation member into an extending direction of the toggle mechanism.

Preferably, the second platen is able to move back and forth, the pressure receiving platen is located on a side remote from the first platen, of the second platen and is able to move back and forth in a direction opposite to a direction of the second platen in conjunction with the second platen, and the first platen is able to move back and forth in a direction identical to a direction of the pressure receiving platen in conjunction with the pressure receiving platen.

BRIEF DESCRIPTION OF DRAWINGS

FIGS. 1A and 1B are drawings showing a mold clamping device according to an embodiment of the present invention, in which FIG. 1A a side view showing a state in which a toggle mechanism is bent; and FIG. 1B is a side view showing a state in which the toggle mechanism is linear.

DESCRIPTION OF EMBODIMENTS

Figure 2:
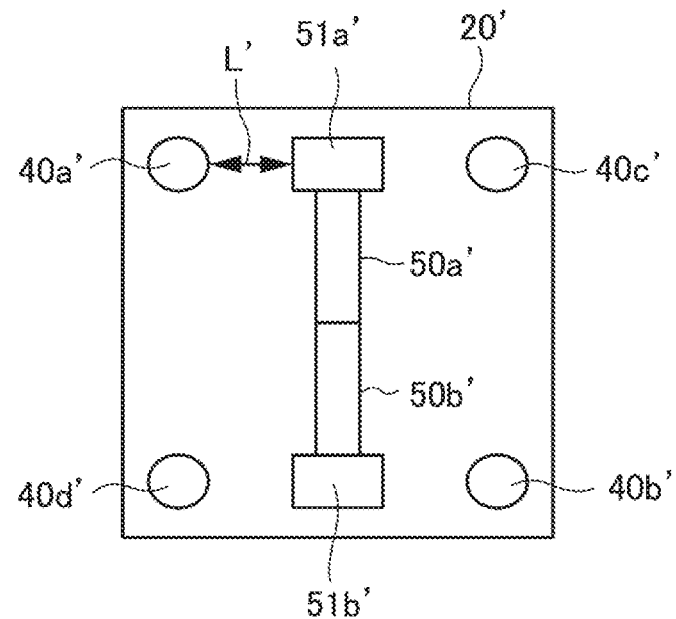
FIG. 2 is a front view schematically showing the relationship between a toggle mechanism and a second platen in a mold clamping device according to conventional art.

Now, a mode for carrying out the present invention (hereafter referred to as "embodiment") will be described in detail with reference to the accompanying drawings.

Overall Configuration of Mold Clamping Device

FIGS. 1A and 1B show a mold clamping device 1 according to the present embodiment. FIG. 1A shows a state in which a toggle mechanism 50 is bent (molds are open), and FIG. 1B shows a state in which the toggle mechanism 50 is linear (molds are closed). The mold clamping device 1 includes a first platen 10, a second platen 20 opposed to the first platen 10, a pressure receiving platen 30 located on a side remote from the first platen 10, of the second platen 20, tie bars 40 that penetrate the first platen 10, second platen 20, and pressure receiving platen 30, the toggle mechanism 50 disposed between the second platen 20 and pressure receiving platen 30, and a mold clamping mechanism 60 and a mold thickness adjustment mechanism 70 disposed on the pressure receiving platen 30. While the mold clamping device 1 is supported by a base or frame, the base or the like is a known one and will not be described.

The toggle mechanism 50 consists of a pair of a first toggle 50a and a second toggle 50b that are disposed on a diagonal line of the second platen 20. The tie bars 40 consist of a pair of a first tie bar 40a and a second tie bar 40b that are disposed on extensions of the diagonal line of the second platen 20 so as to correspond to the toggle mechanism 50.

In the present embodiment, the direction in which the first platen 10 is located is referred to as "front" or "front direction," and the direction in which the pressure receiving platen 30 is located is referred to as "rear" or "rear direction." As the reference signs of the pair of first toggle 50a and second toggle 50b forming the toggle mechanism 50 contain a suffix "a" or "b," other pairs of elements corresponding to the first toggle 50a and second toggle 50b also contain a suffix "a" or "b." However, a pair of elements that have common characteristics may be described without containing "a" or "b." Now, the elements will be described individually.

First Platen, Second Platen

As shown in FIGS. 1A and 1B, the first platen 10 and second platen 20 are opposed platens, and a first mold 100 and a second mold 200 serving as a pair of split molds to form molded articles are mounted on the rear surface of the first platen 10 and the front surface of the second platen 20, respectively. The first platen 10 is a movable platen configured to be able to move back and forth, and the second platen 20 is a movable platen configured to be able to move back and forth in a direction opposite to the direction of the first platen 10 in conjunction with the first platen 10. Details of the movement in a direction opposite to the direction of the first platen 10 in conjunction with the first platen 10 will be described later.

Front mounting parts 51 of the toggle mechanism 50 (a first front mounting part 51a of the first toggle 50a, a second front mounting part 51b of the second toggle 50b) are mounted on a first corner and a second corner of the surface remote from the first platen 10, of the second platen 20, that is, the rear surface thereof. The second platen 20 is configured to move back and forth in a direction opposite to the direction of the first platen 10 in conjunction with the first platen 10 by expansion/contraction of the toggle mechanism 50. When the first platen 10 moves backward and the second platen 20 moves forward, the first mold 100 mounted on the rear surface of the first platen 10 and the second mold 200 mounted on the front surface of the second platen 20 are closed as shown in FIG. 1B, and a molded article is formed. Then, when the first platen 10 moves forward and the second platen 20 moves backward, the first mold 100 and second mold 200 are opened as shown in FIG. 1A, and the molded article is taken out.

The first platen 10 and second platen 20 are in the shape of polygons (rectangles in the present embodiment) in front view and are disposed such that the top and bottom sides of the polygons are horizontal and the left and right sides thereof are vertical. The first mold 100 and second mold 200 are mounted on the first platen 10 and second platen 20 so as to be located in the approximate centers of the polygons.

Figure 3:
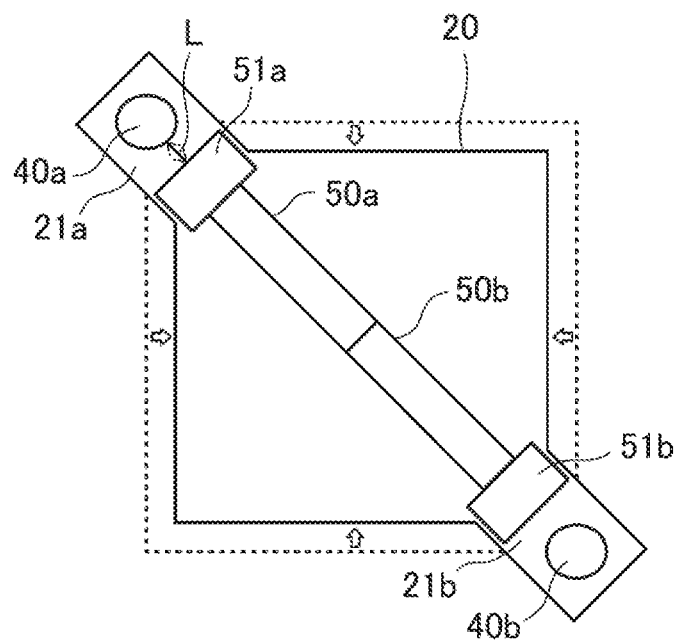
FIG. 3 is a front view schematically showing the relationship between the toggle mechanism and a second platen in the mold clamping device according to the embodiment of the present invention.

The relationship between the second platen 20 and toggle mechanism 50 will be described with reference to the schematic front views of FIGS. 2 and 3. In a conventional mold clamping device, as shown in FIG. 2, a pair of toggles 50a', 50b' are disposed vertically with respect to a polygonal second platen 20', and four tie bars 40a', 40b', 40c', 40d' penetrate the four corners of the polygonal second platen 20'. On the other hand, in the present embodiment, as shown in FIG. 3, the pair of toggle 50a and toggle 50b are disposed on the diagonal of the polygonal second platen 20, and the number of the tie bars 40 (the pair of tie bar 40a, 40b) is two and is smaller than that of the conventional tie bars. The disposition of the toggle mechanism 50 on the diagonal line will be described later.

A pair of protrusions 21 (first protrusion 21a, second protrusion 21b) are disposed outside the first front mounting part 51a of the first toggle 50a and the second front mounting part 51b of the second toggle 50b on the second platen 20, that is, on extension s of the diagonal line of the second platen 20. The first tie bar 40a and second tie bar 40b penetrate the first protrusion 21a and second protrusion 21b, respectively.

Since the pair of protrusions 21 protrude from the second platen 20 as described above, the second platen 20 is smaller in surface area and thus smaller in size and more lightweight than the conventional second platen. Also, the distance L between the first front mounting part 51a and first protrusion 21a is smaller than the distance L' between the first front mounting part 51a' and first tie bar 40a' on the conventional second platen 20'. Thus, a moment that occurs between the first front mounting part 51a and first tie bar 40a can be minimized, and the second platen 20 can be adjusted such that the required strength thereof is reduced, that is, the thickness thereof is reduced.

Figure 4:
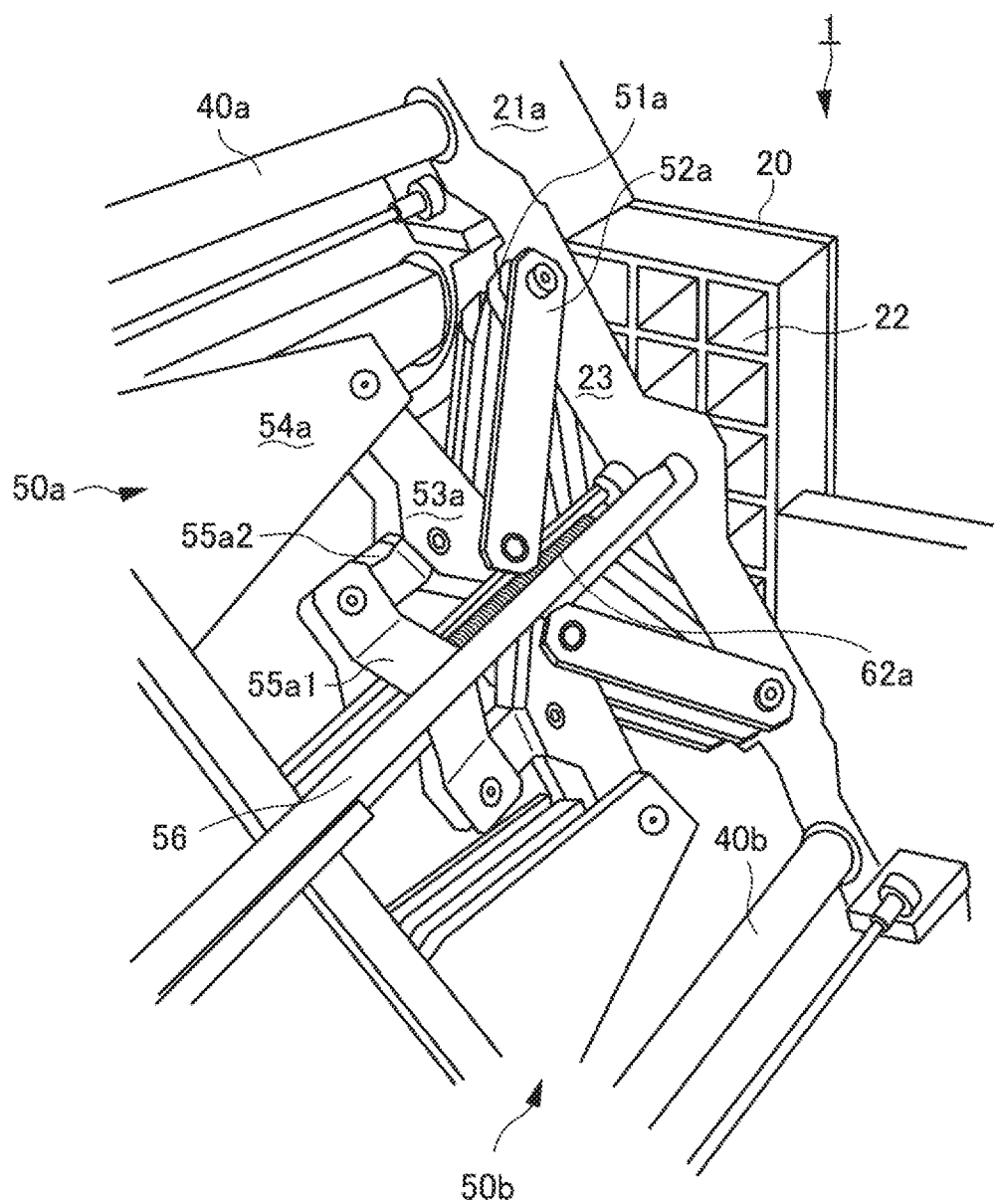
FIG. 4 is an enlarged view showing a state in which the toggle mechanism is bent in the mold clamping device according to the embodiment of the present invention.
Figure 5:
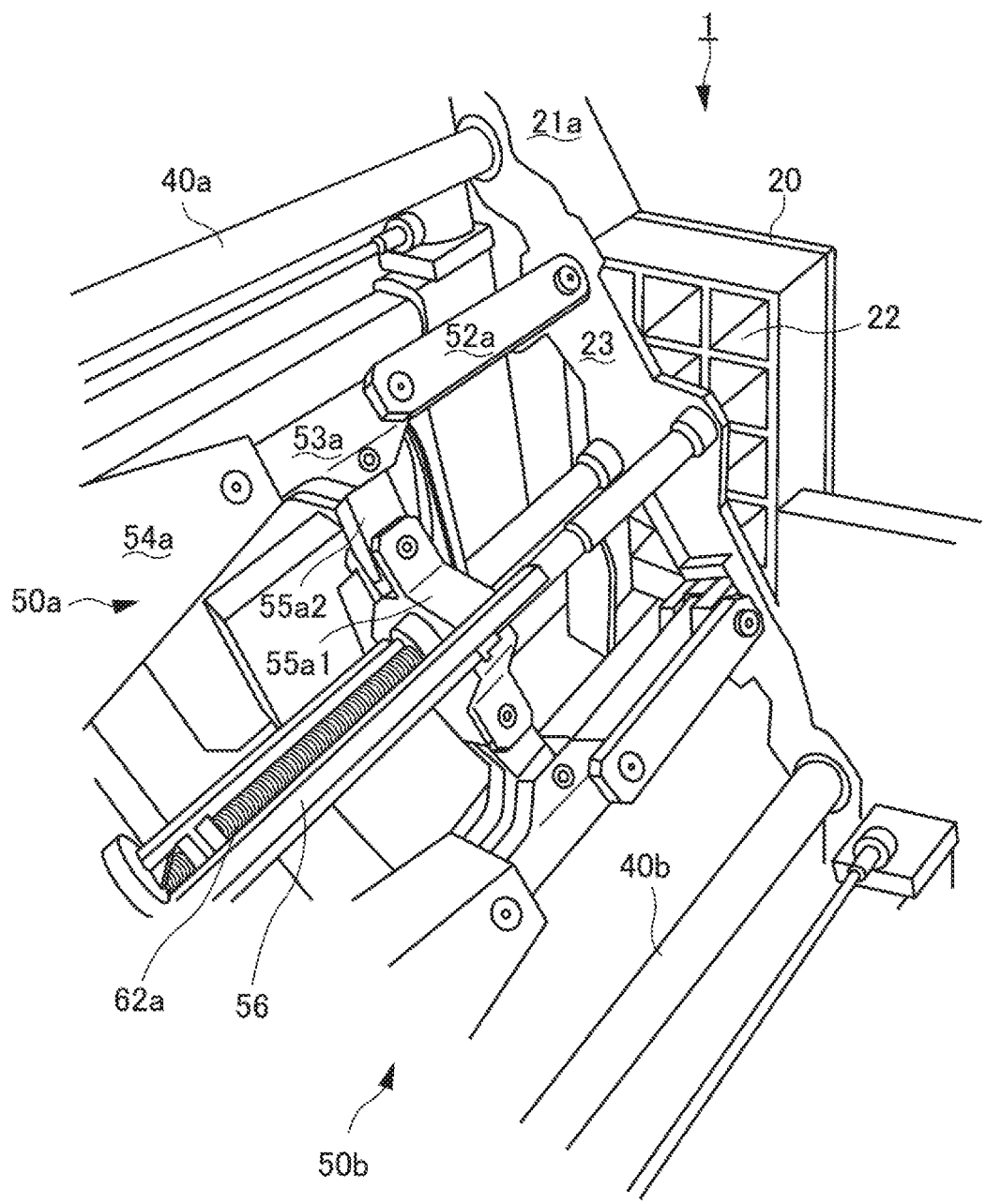
FIG. 5 is an enlarged view showing a state in which the toggle mechanism is linear in the mold clamping device according to the embodiment of the present invention.

As shown in the enlarged views of FIGS. 4 and 5, to achieve both light weight and strength, the rear surface of the second platen 20, which is close to the toggle mechanism 50, is formed in a rib structure 22 in which cavities and ribs are formed in a grid. Due to the rib structure 22, the second platen 20 can reduce weight while maintaining required strength. While, in the present embodiment, the rib structure 22 is in the shape of a polygonal grid along the vertical and horizontal directions, it may be in the shape of a rhombic grid along the directions of the pair of diagonal lines of the second platen 20 in accordance with the inclination of the toggle mechanism 50.

Since the rear surface of the second platen 20 has the rib structure 22, the first front mounting part 51a of the first toggle 50a is mounted to the second platen 20 with a narrow, long second mounting plate 23 between the first front mounting part 51a and the rib structure 22. Although hidden in the figures, the second front mounting part 51b of the second toggle 50b is mounted in the same manner.

Pressure Receiving Platen

As shown in FIGS. 1A and 1B, the pressure receiving platen 30 is a rear platen located on the side remote from the first platen 10, of the second platen 20, that is, in the rear of the second platen 20. The pressure receiving platen 30 is configured to move back and forth in a direction opposite to the direction of the second platen 20 in conjunction with the second platen 20 by expansion/contraction of the toggle mechanism 50. When the pressure receiving platen 30 moves back, the tie bars 40, whose both ends are fixed to the first platen 10 and pressure receiving platen 30, are pulled back. Thus, the first platen 10 also moves backward, as does the pressure receiving platen 30. As seen above, the first platen 10, second platen 20, and pressure receiving platen 30 are characterized in that these elements move back and forth in conjunction with each other by expansion/contraction of the toggle mechanism 50 and the movement direction of the first platen 10 and pressure receiving platen 30 and the movement direction of the second platen 20 are opposite to each other. Mounted on the front surface of the pressure receiving platen 30, which is close to the second platen 20, are rear mounting parts 54 of the toggle mechanism 50 (a first rear mounting part 54a of the first toggle 50a, a second rear mounting part 54b of the second toggle 50b). When the toggle mechanism 50 expands and the first mold 100 of the first platen 10 and the second mold 200 of the second platen 20 are closed, the pressure receiving platen 30 receives the pressure.

Figure 6:
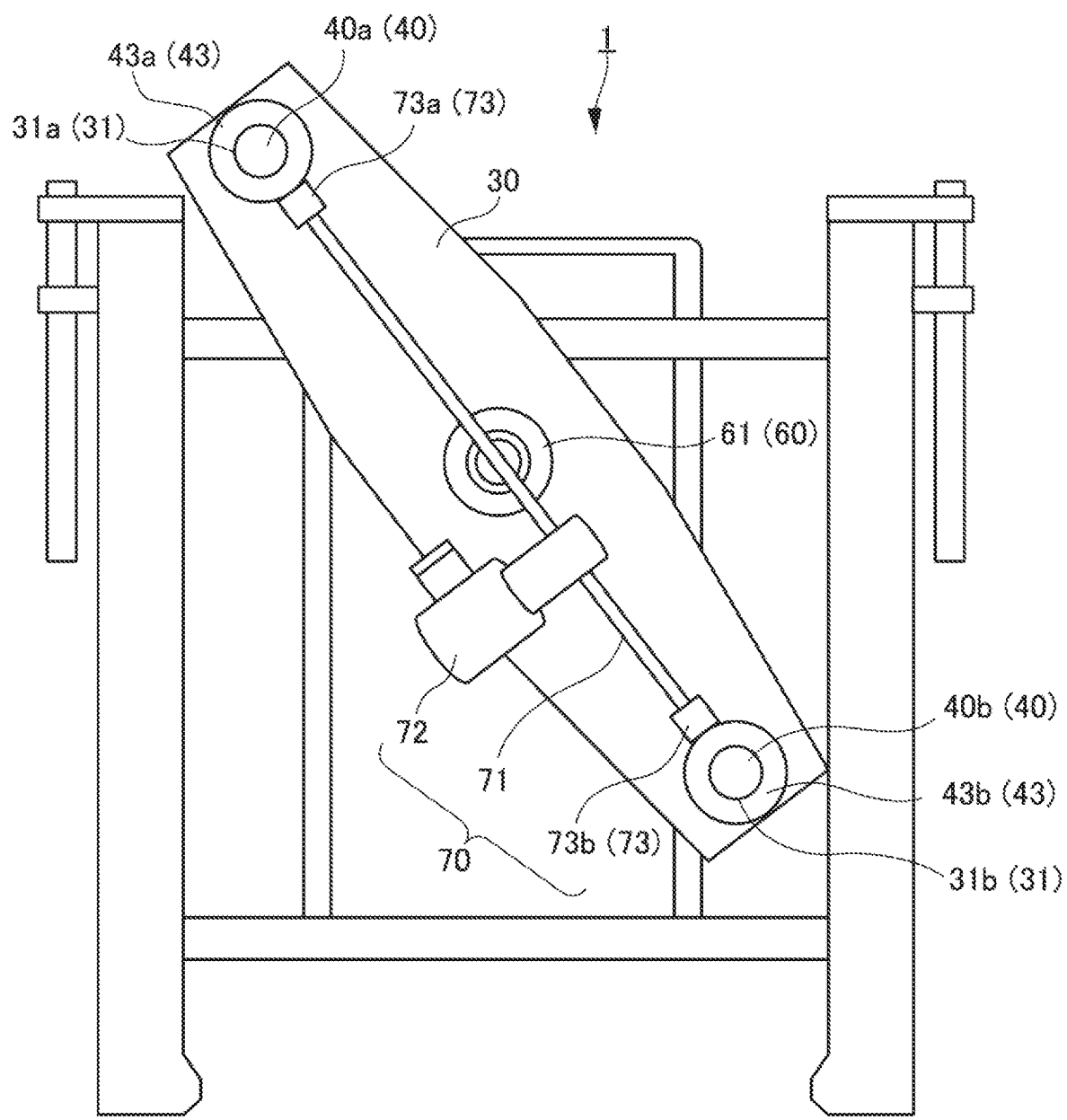
FIG. 6 is a front view showing a pressure receiving platen of the mold clamping device according to the embodiment of the present invention.

As with the first platen 10 or second platen 20, the pressure receiving platen of a conventional mold clamping device is typically in the shape of a polygon. On the other hand, in the present embodiment, the toggle mechanism 50 and tie bars 40 are disposed on the diagonal line. For this reason, as shown in FIG. 6, the rear surface 30a of the pressure receiving platen 30 is in the shape of a long plate necessary and sufficient to ensure the pair of rear mounting parts 54 of the toggle mechanism 50. As with the toggle mechanism 50 and tie bars 40, the rear surface 30a of the pressure receiving platen 30 is disposed such that the length direction thereof corresponds to the diagonal line of the polygonal second platen 20. Since the rear surface 30a is in the shape of a long plate as described above, the pressure receiving platen 30 can be reduced in size and weight compared to the conventional pressure receiving platen.

Rear ends 42 of the tie bars 40 (a first rear end 42a of the first tie bar 40a, a second rear end 42b of the second tie bar 40b) penetrate through parts 31 (first through part 31a, second through part 31b) of the pressure receiving platen 30 and are fixed to the rear surface 30a of the pressure receiving platen 30 using rear nuts 43 (first rear nut 43a, second rear nut 43b). Mounted on the rear surface 30a of the pressure receiving platen 30 are the mold clamping mechanism 60 for driving the toggle mechanism 50 and the mold thickness adjustment mechanism 70 for adjusting the axial length of the tie bars 40 (the distance between the first platen 10 and pressure receiving platen 30) in accordance with the thickness of the first mold 100 and second mold 200. These elements will be described later.

Tie Bar

As shown in FIGS. 1A and 1B, the tie bars 40 are rod-shaped members that penetrate the first platen 10, second platen 20, and pressure receiving platen 30. The tie bars 40 support these elements, define the positional relationship therebetween, and are coupled to the first platen 10 and pressure receiving platen 30. The second platen 20 can oscillate with respect to the tie bars 40. In the present embodiment, as described above, the tie bars 40 consist of the two tie bars, first tie bar 40a and second tie bar 40b, corresponding to the first toggle 50a and second toggle 50b.

Front ends of the tie bars 40 penetrate the first platen 10 and are fixed to the front surface of the first platen 10 using front nuts 41 (first front nut 41a, second front nut 41b). On the other hand, the rear ends 42 thereof (the first rear end 42a of the first tie bar 40a, the second rear end 42b of the second tie bar 40b) penetrate the through parts 31 (first through part 31a, second through part 31b) of the pressure receiving platen 30 and are fixed to the rear surface 30a of the pressure receiving platen 30 using the rear nuts 43 (first rear nut 43a, second rear nut 43b). That is, the first platen 10 and pressure receiving platen 30 are connected and fixed to each other through the tie bars 40. Accordingly, when the pressure receiving platen 30 moves back and forth by the expansion/contraction of the toggle mechanism 50, the first platen 10 also moves back and forth in the same direction in conjunction with the pressure receiving platen 30.

By reducing the number of tie bars 40 from four, which is the number of conventional ones, to two as described above, the number of related members can be reduced, and the structure can be simplified. Thus, the overall weight and cost of the mold clamping device 1 can be reduced, and maintenance thereof can be simplified.

The rear nuts 43 are configured such that the pressure receiving platen 30 can move back and forth along the tie bars 40 using the mold thickness adjustment mechanism 70. The mold thickness adjustment mechanism 70 positions the pressure receiving platen 30 with respect to the first platen 10 in accordance with the thickness of the first mold 100 and second mold 200 so that the timing when the toggle mechanism 50 expands and becomes linear and the timing when the first mold 100 and second mold 200 are properly closed correspond to each other. The mold thickness adjustment mechanism 70 will be described again later.

Toggle Mechanism

As described above, the toggle mechanism 50 is disposed between the second platen 20 and pressure receiving platen 30. The toggle mechanism 50 is a type of link mechanism. The toggle mechanism 50 is a mechanism that can be expanded and contracted by switching between a state in which two rotatably coupled links form a bend and a state in which such links form a straight line and whose output is increased using a servo structure. In the present embodiment, the toggle mechanism 50 consists of the pair of first toggle 50a and second toggle 50b. Referring again to FIGS. 1A to 5, the first toggle 50a will be described below as a representative, but the description also applies to the second toggle 50b.

The configuration of the toggle mechanism 50 need not be that shown in the drawings. In the first toggle 50a (second toggle 50b) of the present embodiment, the first front mounting part 51a (second front mounting part 51b), a first front link 52a (second front link 52b), a first rear link 53a (second rear link 53b), and the first rear mounting part 54a (second rear mounting part 54b) are coupled to each other from the second platen 20 toward the pressure receiving platen 30 so as to be rotatable with respect to each other around pins.

Also, a first crosshead 55*a* (second crosshead 55*b*) for switching between a state in which the first front link 52*a* and first rear link 53*a* form a bend and a state in which these links form a straight line is coupled to the first rear link 53*a* so as to be rotatable around a pin. The first crosshead 55*a* is driven in the front-rear direction by the mold clamping mechanism 60 (to be discussed later). In the present embodiment, the first crosshead 55*a* includes a first base 55*a*1 that oscillates along a rail 56 and a first displacement part 55*a*2 that is connected to the first rear link 53*a* so as to rotatable around a pin. The first base 55*a*1 and first displacement part 55*a*2 are coupled to each other so as to be rotatable around a pin. For example, the first rear link 53*a* (second rear link 53*b*) and a first joint 57*a* (second joint 57*b*) that allows the first crosshead 55*a* (second crosshead 55*b*) to rotate can serve as the center of movement of the toggle mechanism 50. This will be described later.

A first ball screw 62*a* is disposed over the rail 56 (a second ball screw 62*b* is disposed under the rail 56). When the first ball screw 62*a* is rotated by the mold clamping mechanism 60 (to be discussed later) disposed on the rear surface 30*a* of the pressure receiving platen 30, the first base 55*a*1 of the first crosshead 55*a* moves toward the second platen 20 along the axial direction of the first ball screw 62*a*. Thus, the first displacement part 55*a*2 of the first crosshead 55*a* pushes up the first rear link 53*a* (in the second toggle 50*b*, the second displacement part 55*b*2 of the second crosshead 55*b* pushes down the second rear link 53*b*). As a result, the first front link 52*a* slides forward, and the first rear link 53*a* and first front link 52*a* are expanded, forming a straight line.

Thus, the second platen 20 having the second mold 200 mounted thereon moves forward and approaches the first platen 10 having the first mold 100 mounted thereon, and the pressure receiving platen 30 moves back in a direction opposite to the direction of the second platen 20. As the pressure receiving platen 30 moves back, the tie bars 40 are pulled back and thus the first platen 10 moves back. At this time, if a setting is made in advance such that the distance between the pressure receiving platen 30 and first platen 10 is adapted to the thickness of the first mold 100 and second mold 200 by the tie bars 40, the first mold 100 and second mold 200 are closed. Note that depending on the thickness of the first mold 100 and second mold 200, the distance between the pressure receiving platen 30 and first platen 10 may not be adapted to the thickness of the first mold 100 and second mold 200. In this case, the mold thickness adjustment mechanism 70 (to be discussed later) adjusts the distance between the pressure receiving platen 30 and first platen 10 by causing the pressure receiving platen 30 to oscillate with respect to the tie bars 40.

On the other hand, when the first ball screw 62*a* is reversely rotated by the mold clamping mechanism 60, the first base 55*a*1 of the first crosshead 55*a* moves back toward the pressure receiving platen 30 along the axial direction of the first ball screw 62*a*. Thus, the first displacement part 55*a*2 of the first crosshead 55*a* pulls down the first rear link 53*a* (in the second toggle 50*b*, the second displacement part 55*b*2 of the second crosshead 55*b* pulls up the second rear link 53*b*). Thus, the first rear link 53*a* and first front link 52*a* form a bend. Thus, the first platen 10 having the first mold 100 mounted thereon and the second platen 20 having the second mold 200 mounted thereon depart from each other and are opened.

In the present embodiment, when the toggle mechanism 50 is expanded or contracted, a straight line connecting the first joint 57*a* and second joint 57*b* (a dot-and-dash line in FIGS. 1A and 1B) serves as the central axis of the movement of the toggle mechanism 50. In other words, a portion of the toggle mechanism 50 on the central axis is a portion that does not move back and forth even when the first platen 10, second platen 20, and/or pressure receiving platen 30 move back and forth. To be exact, a plane obtained by extending this portion in a direction perpendicular to the surfaces of the drawings can be said to be the center of the back and forth movement of the first platen 10, second platen 20, and pressure receiving platen 30 (hereafter referred to as immovable plane P). Accordingly, when the molds are closed or opened, the first joint 57*a* and second joint 57*b* move in parallel on the dot-and-dash line in FIGS. 1A and 1B. The second platen 20 and pressure receiving platen 30 horizontally move (move back and forth) so as to be symmetric with respect to the immovable plane P.

The immovable plane is preferably set on the dot-and-dash line, but need not necessarily be set thereon. For example, the immovable plane may be set in the vicinity of the dot-and-dash line. By setting the immovable plane on the dot-and-dash line or in the vicinity thereof, a molten resin parison is hung down to the approximate midpoint between the first mold 100 and second mold 200 which are opened, and the first mold 100 and second mold 200 move in opposite directions by approximately equal distances. Thus, the molds are closed with the parison pressed from both sides.

Referring back to FIG. 3, characteristics of the toggle mechanism 50 according to the present embodiment will be described. The toggle mechanism 50 is disposed on the diagonal line of the second platen 20 with the first toggle 50*a* and second toggle 50*b* opposed to each other.

The mold clamping device 1 is efficiently operated by facilitating replacement of the first mold 100 and second mold 200 or take-out of a molded article. For this reason, it is effective that a greater distance be provided between the first mold 100 and second mold 200 that are opened. Also, the following relationship is established: "the distance (daylight) between the first mold 100 and second mold 200 that are opened" corresponds to "the length of the stroke of the second platen 20" and thus corresponds to "the amount of expansion/contraction of the toggle mechanism 50."

The conventional toggle mechanism 50' consists of the pair of upper and lower toggles 50*a*', 50*b*'. For this reason, if the length of the links forming the toggle mechanism 50' is increased, interference or collision would occur between the pair of upper and lower toggles 50*a*', 50*b*'. Accordingly, there is a limit to the length of the links. Obtaining the desired length beyond the limit involves upsizing the toggle mechanism 50', resulting in upsizing of elements such as the second platen 20' and thus upsizing of the entire mold clamping device.

The present inventors diligently considered a solution to this problem. As a result, the present inventors found that to dispose the toggle mechanism 50 in a position corresponding to a diagonal line of the polygonal second mold 20, that is, to dispose the first toggle 50*a* and second toggle 50*b* so as to be inclined with respect to the second platen 20 is effective in solving this problem. FIG. 2 schematically shows a case in which the pair of toggles 50*a*', 50*b*' are vertically disposed, and FIG. 3 schematically shows a case in which the pair of toggles 50*a*, 50*b* are disposed on the diagonal. If the second platen 20 is in the shape of a square, a diagonal line thereof is $\sqrt{2}$ times of each side. Accordingly, if the pair of toggles 50*a*, 50*b* is disposed on the diagonal line, the length of the links of the toggle mechanism 50 can become about 1.4 times that when the pair of toggles 50*a*', 50b' are vertically disposed, without having to change the size of the second platen 20 and thus the size of the entire mold clamping device.

Also, by disposing the first front mounting part 51a and second front mounting part 51b near the first tie bar 40a and second tie bar 40b, the load imposed on the second platen 20 and tie bars 40 can be reduced. This effect is maximized if the first tie bar 40a and second tie bar 40b and the first front mounting part 51a and second front mounting part 51b are disposed on the same line. Similarly, by disposing the first rear mounting part 54a and second rear mounting part 54b near the first tie bar 40a and second tie bar 40b, the load imposed on the pressure receiving platen 30 and tie bars 40 can be reduced. This effect is also maximized if the first tie bar 40a and second tie bar 40b and the first rear mounting part 54a and second rear mounting part 54b are disposed on the same line.

Mold Clamping Mechanism

As shown in FIG. 6, disposed on the rear surface 30a of the pressure receiving platen 30 is a mold clamping motor 61 serving as the mold clamping mechanism 60 for moving back and forth the first crosshead 55a and second crosshead 55b of the toggle mechanism 50. Connected to the mold clamping motor 61 are the first ball screw 62a and second ball screw 62b shown in FIGS. 1A and 1B. The mold clamping motor 61 is, for example, a servo motor. The first base 55a1 of the first crosshead 55a and the second base 55b1 of the second crosshead 55b are in the shape of ball nuts and are fastened to the first ball screw 62a and second ball screw 62b. When the mold clamping motor 61 rotates or reversely rotates, the first crosshead 55a and second crosshead 55b move forward or backward.

While, in the present embodiment, the mold clamping mechanism 60 is driven by the mold clamping motor 61, the mold clamping mechanism 60 may be driven by, for example, an oil hydraulic cylinder in place of the mold clamping motor 61. In this case, the first ball screw 62a and second ball screw 62b may be in the shape of rods, and the first crosshead 55a and second crosshead 55b may be fastened thereto.

Mold Thickness Adjustment Mechanism

As shown in FIG. 6, disposed on the rear surface 30a of the pressure receiving platen 30 in addition to the mold clamping mechanism 60 is the mold thickness adjustment mechanism 70 for adjusting the positioning of the pressure receiving platen 30 along the two tie bars, first tie bar 40a and second tie bar 40b. The mold thickness adjustment mechanism 70 positions the pressure receiving platen 30 with respect to the first platen 10 in accordance with the thickness of the first mold 100 and second mold 200 so that the timing when the toggle mechanism 50 expands and becomes linear and the timing when the first mold 100 and second mold 200 are properly closed correspond to each other.

The first rear end 42a of the first tie bar 40a and the second rear end 42b of the second tie bar 40b penetrate the first through part 31a and second through part 31b of the pressure receiving platen 30 and are fixed to the rear surface 30a of the pressure receiving platen 30 using the first rear nut 43a and second rear nut 43b. When the first rear nut 43a and second rear nut 43b rotate or reversely rotate due to the following configuration, the pressure receiving platen 30 is adjusted so as to be able to move back and forth.

The mold thickness adjustment mechanism 70 includes a rotation member 71 constructed on a diagonal line between the first rear nut 43a and second rear nut 43b, an adjustment motor 72 that consists of an electric motor for rotating or reversely rotating the rotation member 71, and converters 73 (first converter 73a, second converter 73b) that convert the rotation direction of the rotation member 71 and transmits the rotational force to the first rear nut 43a and second rear nut 43b.

Figure 7:
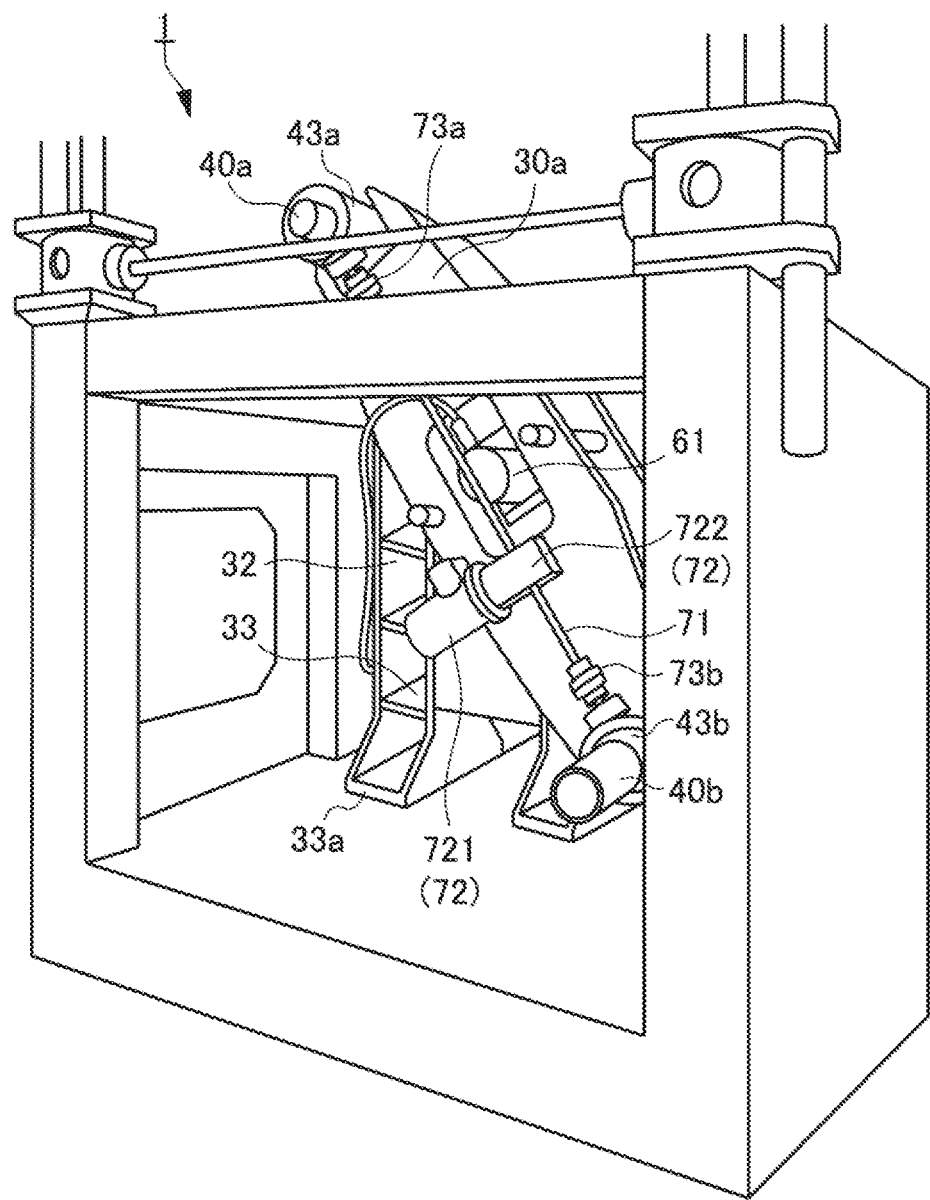
FIG. 7 is a drawing showing a mold thickness adjustment mechanism disposed on the pressure receiving platen of the mold clamping device according to the embodiment of the present invention.
Figure 8:
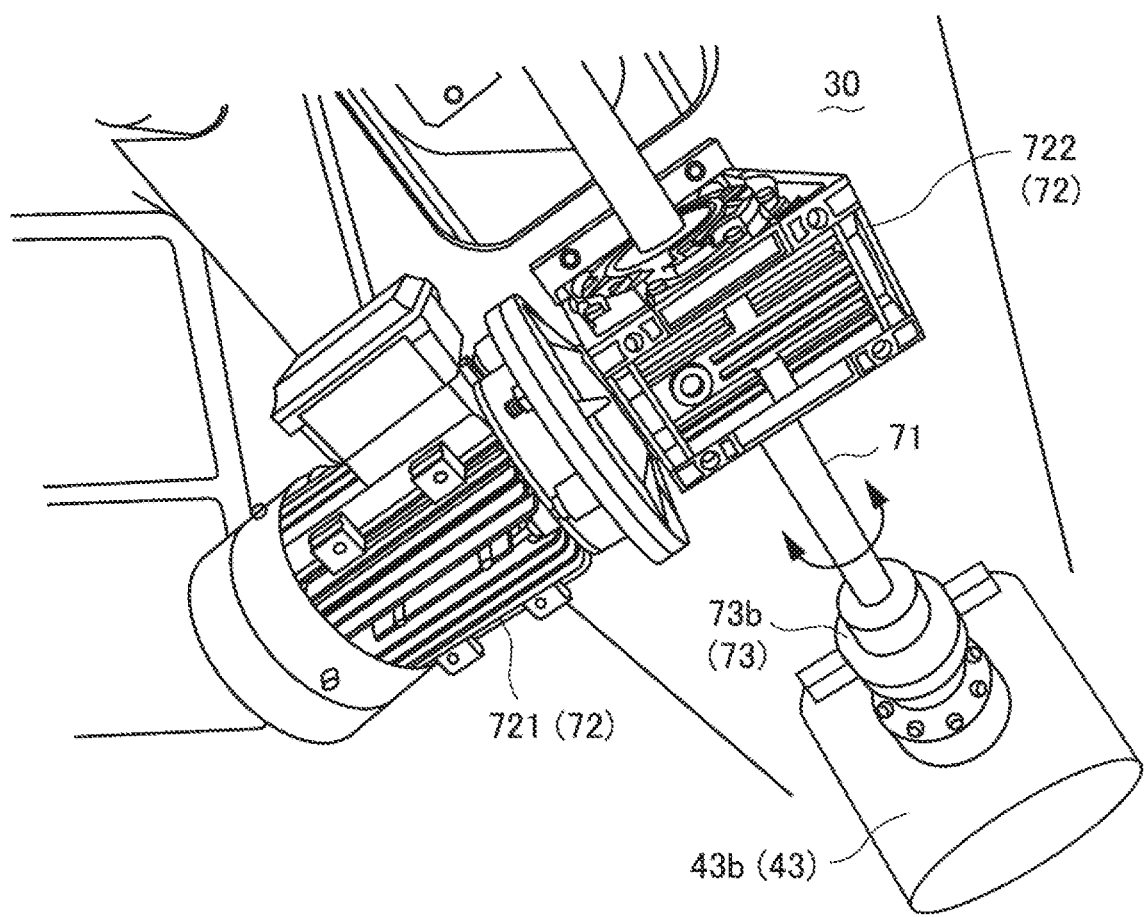
FIG. 8 is an enlarged view of an adjustment motor of the mold thickness adjustment mechanism of the mold clamping device according to the embodiment of the present invention.
Figure 9:
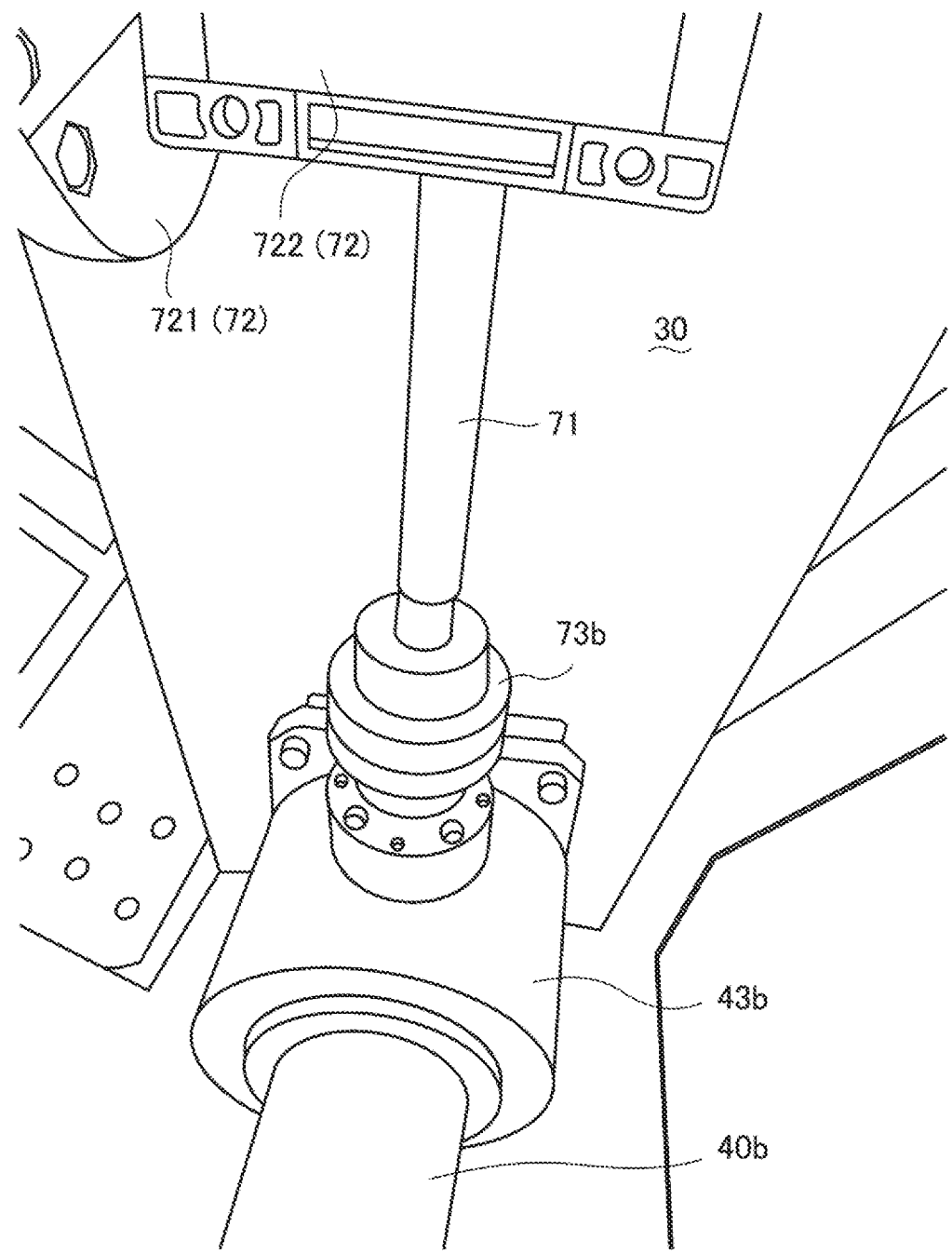
FIG. 9 is an enlarged view of a rotation direction converter of the mold thickness adjustment mechanism of the mold clamping device according to the embodiment of the present invention.

Referring now to FIGS. 7 to 9, the mold thickness adjustment mechanism 70 will be described in more detail. FIG. 7 shows an overall perspective view of the mold thickness adjustment mechanism 70 mounted on the rear surface 30a of the pressure receiving platen 30; FIG. 8 is an enlarged view of the adjustment motor 72; and FIG. 9 shows an enlarged view of the converter 73.

As shown in FIG. 7, the rotation member 71 extends along the longitudinal direction of the pressure receiving platen 30, and the adjustment motor 72 is disposed near a lower-right portion of the rotation member 71 so as not to interfere with the mold clamping motor 61 of the mold clamping mechanism 60. The adjustment motor 72 includes a motor body 721 and a gear mechanism 722, and the rotation member 71 penetrates the gear mechanism 722. When the motor body 721 rotates, the rotation member 71 rotates clockwise or counterclockwise (see arrows in FIG. 8) through the gear mechanism 722 around a rotation axis extending in the longitudinal direction of the rear surface 30a of the pressure receiving platen 30, that is, in a direction perpendicular to the extending direction of the tie bars 40. A conventional mold thickness adjustment mechanism uses a band or chain. On the other hand, the mold adjustment mechanism 70 according to the present embodiment uses the rod-shaped rotation member 71 and has the following advantages: the power loss and driving sound are smaller than those when a band or chain is used; and the maintenance frequency can be reduced due to the high durability of the rotation member.

The rear surface 30a of the pressure receiving platen 30 is in the shape of a long plate and is disposed diagonally. For this reason, as shown in FIG. 7, a grounding part 33a of a rib structure 33 where cavities and ribs are formed in a grid disposed on a frame 32 of the pressure receiving platen 30 can be formed as a reinforcement part extending toward the mold thickness adjustment mechanism 70, that is, extending backward. Due to the grounding part 33a, that is, the reinforcement part, the rib structure 33 and pressure receiving platen 30 supported thereby have greater strength against a force from outside.

As shown in FIG. 8, the rotation of the rotation member 71 is converted into the extending direction of the tie bars 40 through the converters 73 and rear nuts 43. In FIG. 8, the relationship between the rotation member 71, and the second converter 73b and second rear nut 43b is shown in an enlarged manner. As shown in FIG. 7, both ends of the rotation member 71 are connected to the pair of first rear nut 43a and second rear nut 43b through the pair of first converter 73a and second converter 73b. For this reason, when the rotation member 71 rotates, the pair of first tie bar 40a and second tie bar 40b are adjusted simultaneously.

In the present embodiment, as shown in FIG. 9, the converters 73 are couplings. The couplings may be known ones. Instead of the couplings, the converters 73 may be bevel gear structures. In sum, the converters 73 may be in any form as long as they convert the rotation direction of the rotation member 71 into the extending direction of the tie bars 40.

Figure 10:
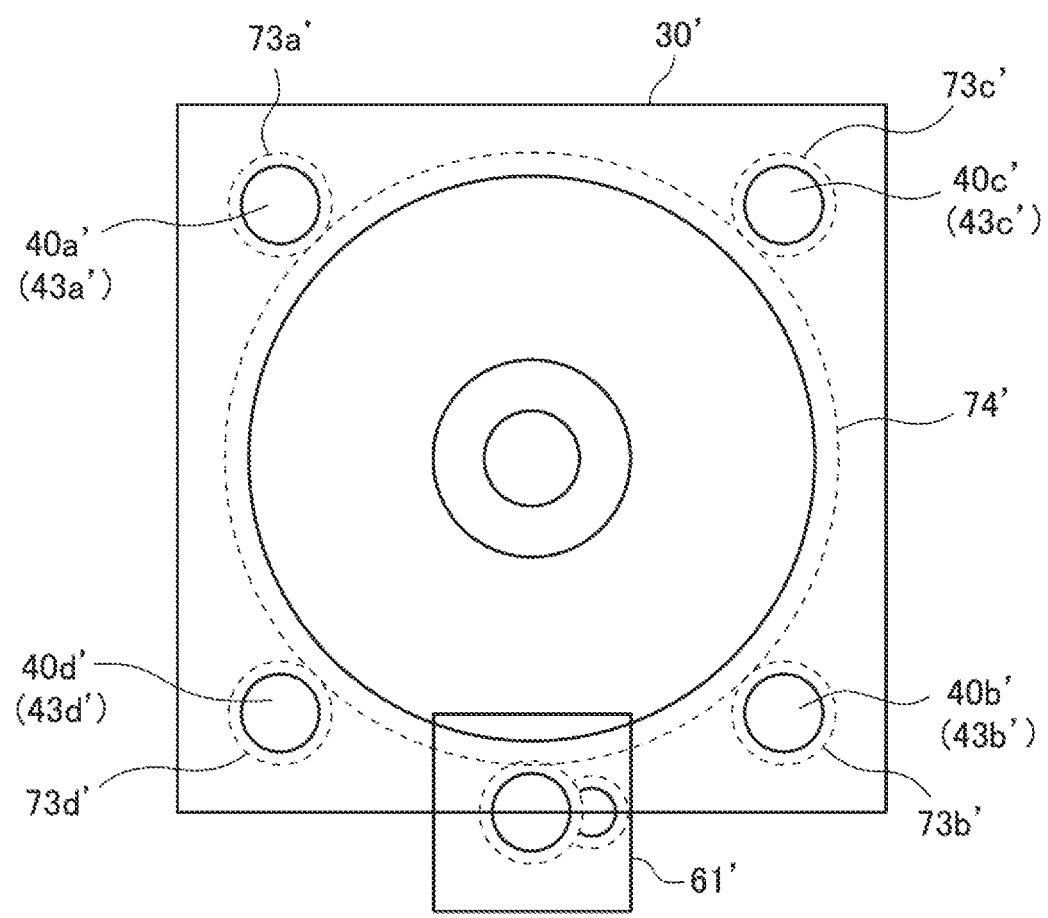
FIG. 10 is a drawing showing an example of a conventional mold thickness adjustment mechanism.

In the conventional mold clamping device as shown in FIG. 2, the toggle mechanism 50' is disposed vertically with respect to the polygonal second platen 20'. Also, as shown in FIG. 10, typically, the pressure receiving platen 30' is also in the shape of a polygon; four gears 73a', 73b', 73c', 73d' for rotating four nuts 43a', 43b', 43c', 43d' for fixing four tie bars 40a', 40b', 40c', 40d' are disposed at the four corners of the pressure receiving platen 30'; and a large intermediate gear 74' that allows the four gears 73a', 73b', 73c', 73d' to collectively rotate by the driving force of the motor 61' is also disposed on the pressure receiving platen 30'. On the other hand, in the mold clamping device according to the present embodiment, the two rear nuts, first rear nut 43a and second rear nut 43b, fixed to both ends of the narrow, long pressure receiving platen 30 are rotated by the rotation member 71 through the converter 73. Thus, the number of mechanical contacts from the adjustment motor 72 serving as a power source to the first rear nut 43a and second rear nut 43b of the first tie bar 40a and second tie bar 40b serving as actuating parts can be reduced, resulting in a reduction in the mechanical load. Also, since the power consumed to adjust the thickness is reduced, the adjustment motor 72 can be downsized. Further, since an intermediate gear or the like is omitted, an increase in design flexibility and a reduction in maintenance effort can be achieved.

Since the number of tie bars 40 is reduced from four, which is the number of conventional ones, to two, a reduction in the number of the elements of the mold thickness adjustment mechanism 70 and simplification of the structure thereof can be achieved. Thus, reductions in the overall weight and cost of the mold clamping device 1 and simplification of the maintenance thereof can be achieved.

While, in the above embodiment, the immovable plane P is a plane obtained by extending the straight line connecting the first joint 57a and second joint 57b in the direction of the surfaces of the figures, the mold clamping device 1 may be embodied such that an immovable plane (immovable part) is located in another position. For example, the mold clamping device 1 may be embodied such that the positions of the first platen 10 and pressure receiving platen 30 are fixed as immovable parts and the second platen 20 alone moves back and forth when opening and closing the molds. Or, the mold clamping device 1 may be embodied such that the position of the second platen 20 is fixed as an immovable part and the first platen 10 and second platen 30 move back and forth when opening and closing the molds.

While the present invention has been described using the embodiment, the technical scope of the invention is not limited to the scope described in the embodiment, as a matter of course. It is obvious for those skilled in the art that various changes or modifications can be made to the embodiment. It is also obvious from the description of Claims that forms obtained by making such changes or modifications can also be included in the technical scope of the present invention. While the mold clamping device of the present invention is particularly preferably used in blow molding machines, it can also be used in other types of molding machines, including injection molding machines.

DESCRIPTION OF REFERENCE SIGNS

1: mold clamping device, 10: first platen, 20: second platen, 20': second platen, 21: protrusion, 21a: first protrusion, 21b: second protrusion, 22: rib structure, 23: mounting plate, 30: pressure receiving platen, 30': pressure receiving platen, 30a: rear surface, 31: through part, 31a: first through part, 31b: second through part, 32: frame, 33: rib structure, 33a: grounding part, 40: tie bar, 40a: tie bar (first tie bar), 40a': tie bar (first tie bar), 40b: tie bar (second tie bar), 40b': tie bar, 40c': tie bar, 40d: tie bar, 41: front nuts, 41a: first front nut, 41b: second front nut, 42: rear end, 42a: first rear end 42a, 42b: second rear end, 43: rear nut, 43a: first rear nut, 43a': nut, 43b: second rear nut, 43b': nut, 43c': nut, 43d: nut, 50: toggle mechanism, 50': toggle mechanism, 50a: toggle (first toggle), 50a': toggle, 50b: toggle (second toggle), 50b': toggle, 51: front mounting part, 51a: first front mounting part, 51a': first front mounting part, 51b: second front mounting part, 52a: first front link, 52b: second front link, 53a: first rear link, 53b: second rear link, 54: rear mounting part, 54a: first rear mounting part, 54b: second rear mounting part, 55a: first crosshead, 55a1: first base, 55a2: first displacement part, 55b: second crosshead, 55b1: second base, 56: rail, 57a: first joint, 57b: second joint, 60: mold clamping mechanism, 61: mold clamping motor, 61': motor, 62a: first ball screw, 62b: second ball screw, 70: mold thickness adjustment mechanism, 71: rotation member, 72: adjustment motor, 73: converter, 73a: first converter, 73a': gear, 73b: second converter, 73b': gear, 73c': gear, 73d: gear, 74': intermediate gear, 100: first mold, 200: second mold, 721: motor body, 722: gear mechanism, L: distance, L': distance, P: immovable plane

The invention claimed is:

1. A mold clamping device for split molds, comprising:
   a first platen;
   a second platen;
   a pressure receiving platen; and
   a mold thickness adjustment mechanism disposed on the pressure receiving platen, wherein
   the second platen is able to move back and forth so as to approach or depart from the first platen,
   the pressure receiving platen is located on a side remote from the first platen, of the second platen, and
   the mold thickness adjustment mechanism comprises:
      a rod-shaped rotation member constructed on a diagonal line of the second platen;
      a power source configured to rotate the rotation member around a rotation axis of the rotation member, the rotation axis being parallel to a longitudinal direction of the rotation member; and
      a pair of converters configured to convert rotation direction of the rotation member into a movement direction of the second platen wherein
   the second platen is able to move back and forth so as to approach or depart from the other the first platen by rotation of the rotation member.

2. The mold clamping device of claim 1, wherein a rear surface of the pressure receiving platen is in the shape of an elongated plate.

3. The mold clamping device of claim 1, further comprising first and second tie bars that penetrate the pressure receiving platen, the second platen, and the first platen and define a relationship between positions of the pressure receiving platen, the second platen, and the first platen, wherein
   the second platen is in the shape of a polygon,
   the second platen comprises first and second protrusions that protrude onto extensions of a diagonal line of the polygon, and
   the first tie bar and the second tie bar penetrate the first protrusion and the second protrusion, respectively.

4. The mold clamping device of claim 1, further comprising a toggle mechanism disposed between the second platen and the pressure receiving platen and configured to move back and forth the second platen with respect to the first platen, wherein the toggle mechanism is disposed on a diagonal line of the second platen.

5. The mold clamping device of claim 1, wherein the power source is an electric motor mounted on a rear surface of the pressure receiving platen.

6. The mold clamping device of claim 1, wherein
the pressure receiving platen includes a frame, and
a grounding part of the frame is formed as a reinforcement part extending toward the mold thickness adjustment mechanism.

7. The mold clamping device of claim 1, wherein
the second platen is able to move back and forth,
the pressure receiving platen is located on a side remote from the first platen, of the second platen and is able to move back and forth in a direction opposite to a direction of the second platen in conjunction with the second platen, and
the first platen is able to move back and forth in a direction identical to a direction of the pressure receiving platen in conjunction with the pressure receiving platen.

8. A mold clamping device for split molds, comprising:
polygonal first and second platens;
a pressure receiving platen; and
a toggle mechanism, wherein
at least one of the first platen and the second platen is able to move back and forth so as to approach or depart from the other,
the pressure receiving platen is located on a side remote from the first platen, of the second platen, and
the toggle mechanism is disposed between the second platen and the pressure receiving platen and on a central diagonal line of the second platen and configured to cause the first and second platens to approach or depart from each other, the toggle mechanism having a toggle mounted on the central diagonal line of the second platen.

9. The mold clamping device of claim 8, wherein
the toggle mechanism comprises:

a first toggle including a first front mounting part which is mounted to a first corner of the second platen on the diagonal line; and a second toggle including a second front mounting part which is mounted to a second corner of the second platen on the diagonal line, the second toggle being opposed to the first toggle.

10. The mold clamping device of claim 9, wherein the first and second mounting parts are mounted to the second platen with an elongated mounting plate disposed between the first and second mounting parts and the second platen.

11. The mold clamping device of claim 8 further comprising first and second tie bars that penetrate the pressure receiving platen, the second platen, and the first platen and define a relationship between positions of the pressure receiving platen, the second platen, and the first platen, wherein
the second platen comprises first and second protrusions that protrude onto extensions of the diagonal line, and
the first tie bar and the second tie bar penetrate the first protrusion and the second protrusion, respectively.

12. The mold clamping device of claim 8, wherein
a rear surface of the pressure receiving platen is in the shape of an elongated plate and is disposed on the diagonal line of the second platen so as to correspond to the toggle mechanism.

13. The mold clamping device of claim 9, further comprising a mold thickness adjustment mechanism disposed on a rear surface of the pressure receiving platen, wherein
the mold thickness adjustment mechanism comprises:
a rod-shaped rotation member;
an adjustment motor configured to rotate the rotation member around a rotation axis of the rotation member, the rotation axis being parallel to a longitudinal direction of the rotation member; and
a pair of converters configured to convert rotation direction of the rotation member into an extending direction of the toggle mechanism.

* * * * *